United States Patent [19]

Orban

[11] Patent Number: 4,462,666
[45] Date of Patent: Jul. 31, 1984

[54] AUTOMATIC ZOOM FLASH
[75] Inventor: John M. Orban, Santa Monica, Calif.
[73] Assignee: Vivitar Corporation, Santa Monica, Calif.
[21] Appl. No.: 420,709
[22] Filed: Sep. 21, 1982
[51] Int. Cl.³ .............................................. G03B 15/05
[52] U.S. Cl. .................................................. 354/126
[58] Field of Search ................................. 354/35, 126

[56] References Cited
U.S. PATENT DOCUMENTS
4,190,880 2/1980 Esaki .................................. 354/35 X Primary Examiner—Michael L. Gellner
Attorney, Agent, or Firm—Lyon & Lyon

[57] ABSTRACT

There is disclosed herein an electronic flash unit and camera combination wherein the angle of the cone of light emitted by the flash unit is automatically varied as a function of the focal length of the camera lens. In one embodiment the camera lens may be a zoom lens, and means is provided for generating a signal which is a function of the selected focal length position of the lens. This signal is received by a circuit of the electronic flash unit. The electronic flash unit may include a zoom head employing a Fresnel lens or the like for changing the angle of the cone of light emitted by the flash unit. A suitable electromagnetic device, such as a small servo motor and control circuit, responds to the signal indicating the selected focal length of the lens and controls the position of the zoom head of the flash unit. The system is particularly useful with zoom lenses of the type wherein the zooming focal length change is accomplished by moving a zoom ring or "pump" in and out along the axis of the lens. The system also is applicable to other types of zoom lenses and to the use of different fixed focal length lenses which provide focal length signals to the flash unit circuit.

11 Claims, 10 Drawing Figures

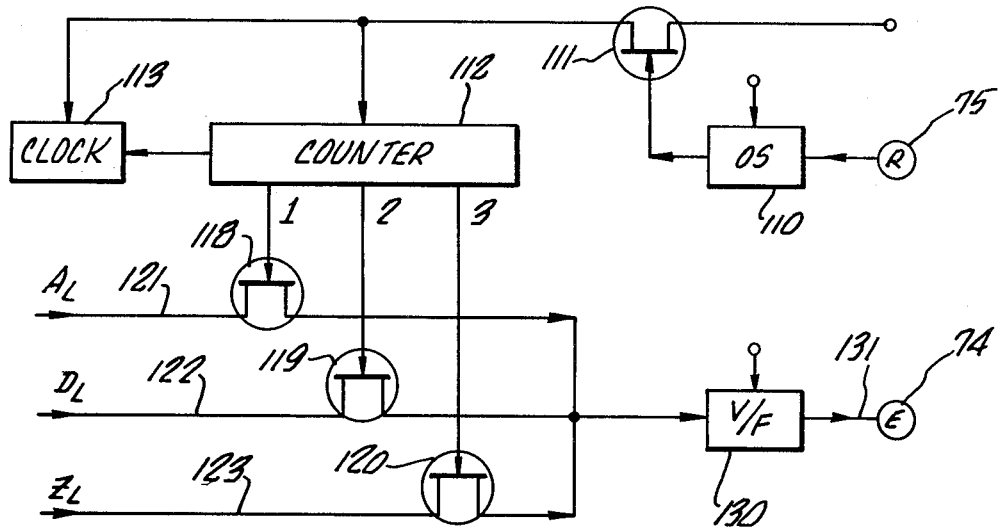
_FIG. 6A._
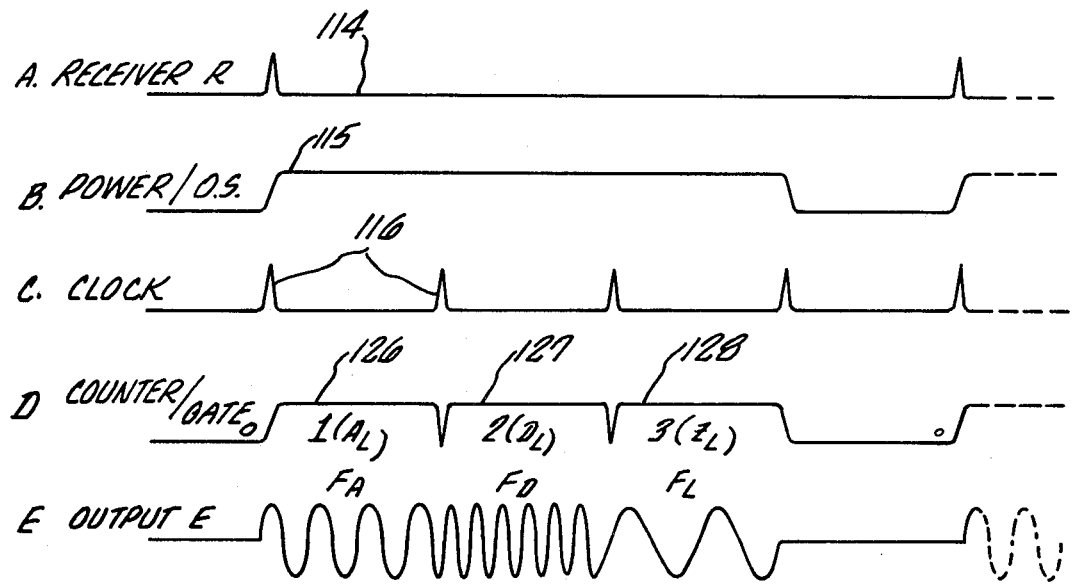
_FIG. 6B._

AUTOMATIC ZOOM FLASH

BACKGROUND OF THE INVENTION

The present invention relates to the field of photography, and more particularly to flash photography using electronic flash units which can provide different cones of light output when using a zoom lens or lenses of different focal lengths.

In recent years, electronic flash units have been provided with zoom heads which allow the angle of the cone of light produced by the flashtube of the flash unit to be selected for use with different focal length lenses. Examples are the Vivitar 285, 2500 and 3500. Each of these includes a sliding or extendible head with a Fresnel lens in front of the flashtube. The head may be moved in and out, and thus toward and away from the flashtube, to adjust the angle of the cone of light emitted by the flash unit. In a typical electronic flash unit of this nature, one position is for wide angle photography, another is for normal photography, and another is for telephoto photography.

When flash units of this nature are used, it is necessary for the photographer to select the appropriate position for the zoom head of the flash unit to correspond to the focal length of the lens being used on the associated camera or to correspond to the focal length selected on a zoom lens being used. While this is a relatively simple operation, photographers sometimes forget to make this change in the zoom head, and in any event the need to make any such adjustment intereferes with composing and shooting a picture.

SUMMARY OF THE INVENTION

According to the present invention, a zoom type flash unit is provided with a suitable electro-mechanical system which responds to signals from the camera or camera lens indicative of the selected lens focal length to thereby cause an appropriate change or setting of the zoom head of the flash unit. In an exemplary embodiment according to the present invention, the zoom head or zoom lens of the flash unit is physically coupled with an electrical motor for adjusting the angle of the cone of light emitted from the flash unit. The flash unit includes a suitable electronic control system for controlling the positioning of the motor. This system is responsive to signals from the associated camera or camera lens indicative of lens focal length. In an exemplary embodiment, a zoom lens is provided with a ring which varies in position axially according to the focal length selected for the zoom lens, and its position is detected by the system of the flash unit. For example, in a preferred embodiment the flash unit system may include a radiation source (e.g., light) which emits radiation toward the ring of the zoom lens, and this radiation is reflected back to a radiation sensor of the system. This is an encoding arrangement for providing an electrical signal indicative of the position of the ring of the zoom lens and thus indicative of the selected focal length.

Accordingly, it is an object of the present invention to provide an improved form of electronic flash unit.

Another object of the present invention is to provide an electronic flash unit having an automatically controllable angle of the cone of light emitted by the flash unit as a function of associated lens focal length.

A further object of the present invention is to provide a zoom lens and zoom flash system wherein the selected focal length of the zoom lens is interrogated and used to control the angle of the cone of light emitted by the flash unit.

An additional object of the present invention is to provide a zoom lens and zoom flash system wherein the selected focal length of the zoom lens is interrogated and used to control the position of a zoom head of the flash unit.

Another object of the present invention is to provide an improved form of lens of selectable focal length having means for enabling its selected focal length to be electrically interrogated for controlling a parameter of an associated flash unit.

BRIEF DESCRIPTION OF DRAWINGS

These and other objects and advantages of the present invention will become better understood through a consideration of the following description taken in conjunction with the drawings in which:

FIG. 6a is a block diagram of the encoder of FIG. 4, and FIG. 6b is a waveform diagram illustrating the operation of the encoder.

DETAILED DESCRIPTION OF PREFERRED EMBODIMENTS

Figure 1:
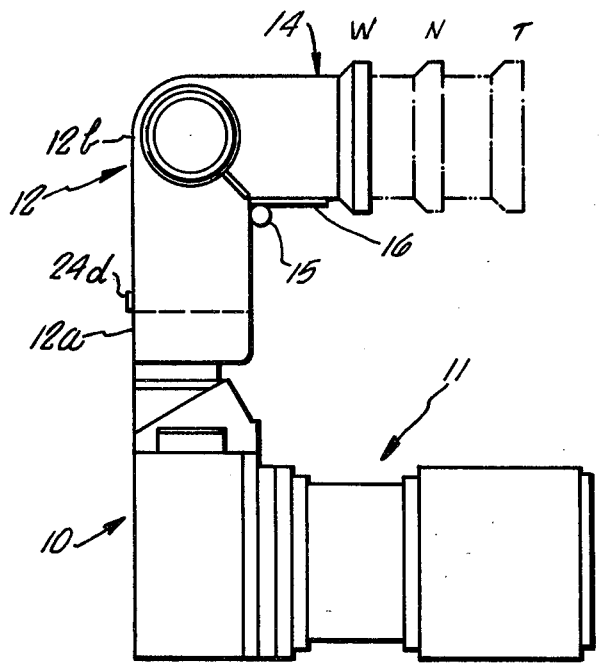
FIG. 1 is a diagrammatic view of a camera, zoom lens and electronic flash unit.

Turning now to the drawings, and first FIG. 1, a conventional form of single lens reflex camera 10, zoom lens 11 and automatic electronic flash unit 12 are diagrammatically illustrated. As will appear later, the camera/lens/flash system includes means (not shown in FIG. 1) for indicating to the flash unit the lens focal length. The flash unit 12 includes a zoom head 14 having, in this example, three positions W, N, and T representing wide angle, normal and telephoto zoom head settings. In present day electronic flash units with a zoom head, such as the Vivitar Model 3500 mentioned earlier, these positions of the zoom head as seen in FIG. 1 are selected manually by the photographer. According to the present invention, the flash unit 12 includes a motor system and linkage respectively diagrammatically indicated at 15 and 16 for causing the zoom head 14 to move to its several positions. The motor system is responsive to the lens focal length as will be explained in greater detail in a discussion of the other figures. A module 12a may be provided for this purpose, and the module 12a also can serve as a dedicated module to enable the flash unit to properly interface with and utilize the features of the associated camera 10 (e.g., cause the shutter speed of the camera to be set to a flash speed, indicate in the viewfinder that the flash is ready, and so forth).

Thus, in its broadest aspect the present invention and embodiments thereof comprise an electronic flash unit having a zoom head or zoom lens arrangement, means for varying the position of the head or lens so as to change the angle of the cone of light emitted, and means responsive to the focal length of the lens being used with the camera/lens combination associated with the flash unit to cause the zoom head or zoom head lens to move to the appropriate position. The invention also contemplates an improved form of lens with means for enabling the focal length of the lens to be electrically interrogated.

Figure 3A:
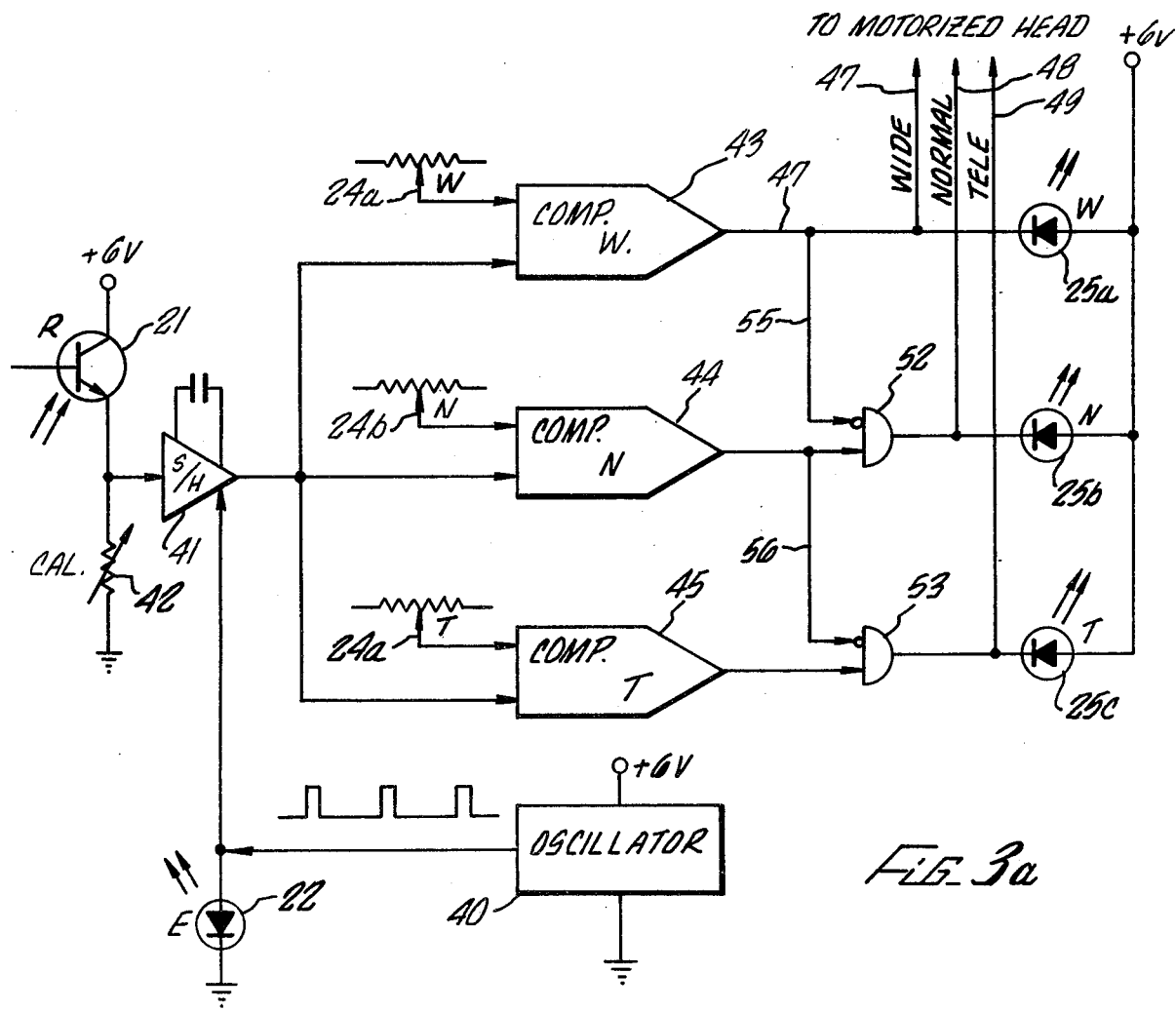
FIGS. 3a and 3b above are circuit diagrams of a control system for the zoom head of an electronic flash unit according to the present invention.
Figure 2:
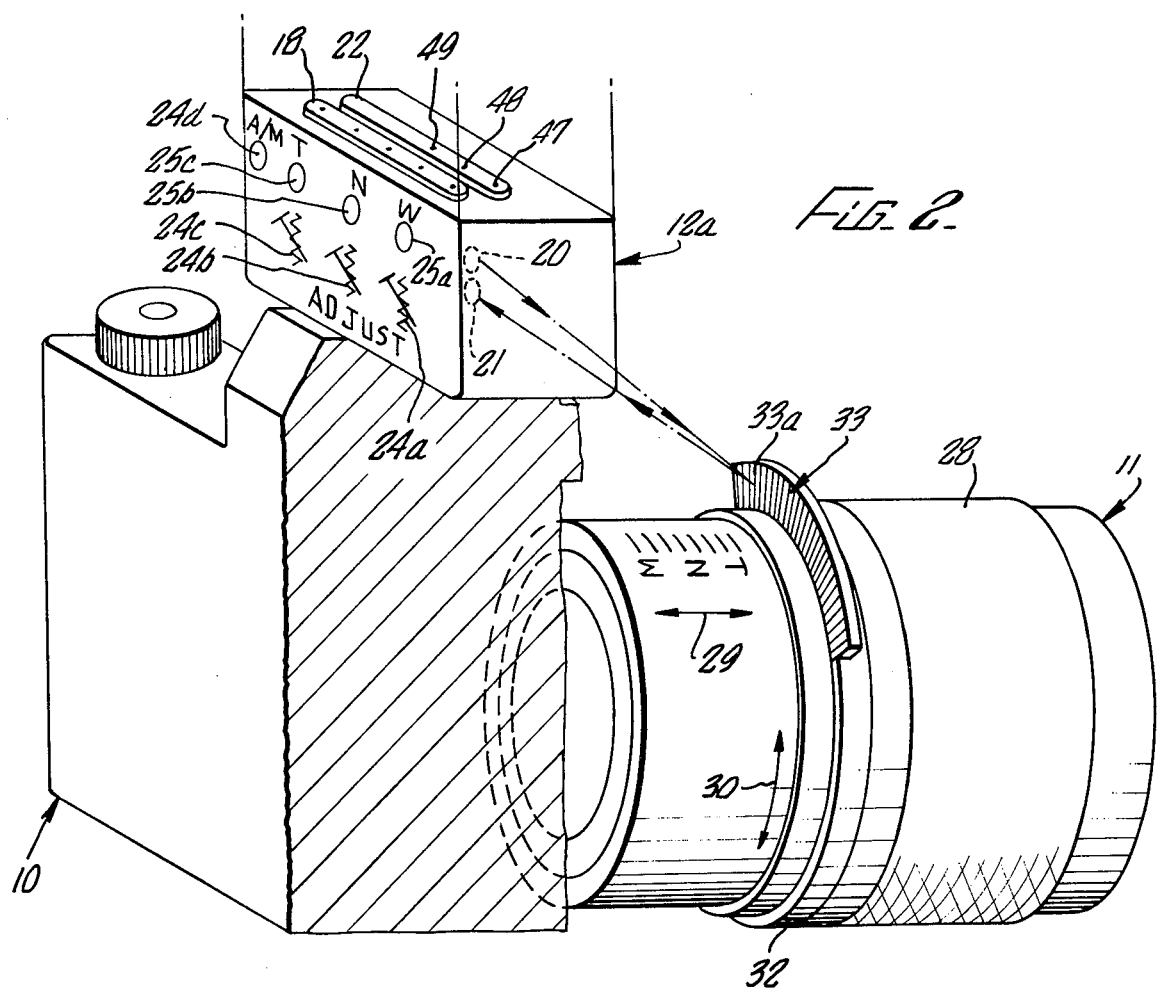
FIG. 2 is a partial view, in greater detail, of a camera and zoom lens, and part of an electronic flash unit, incorporating the concepts of the present invention, and similar to that diagrammatically shown in FIG. 1.
Figure 3B:
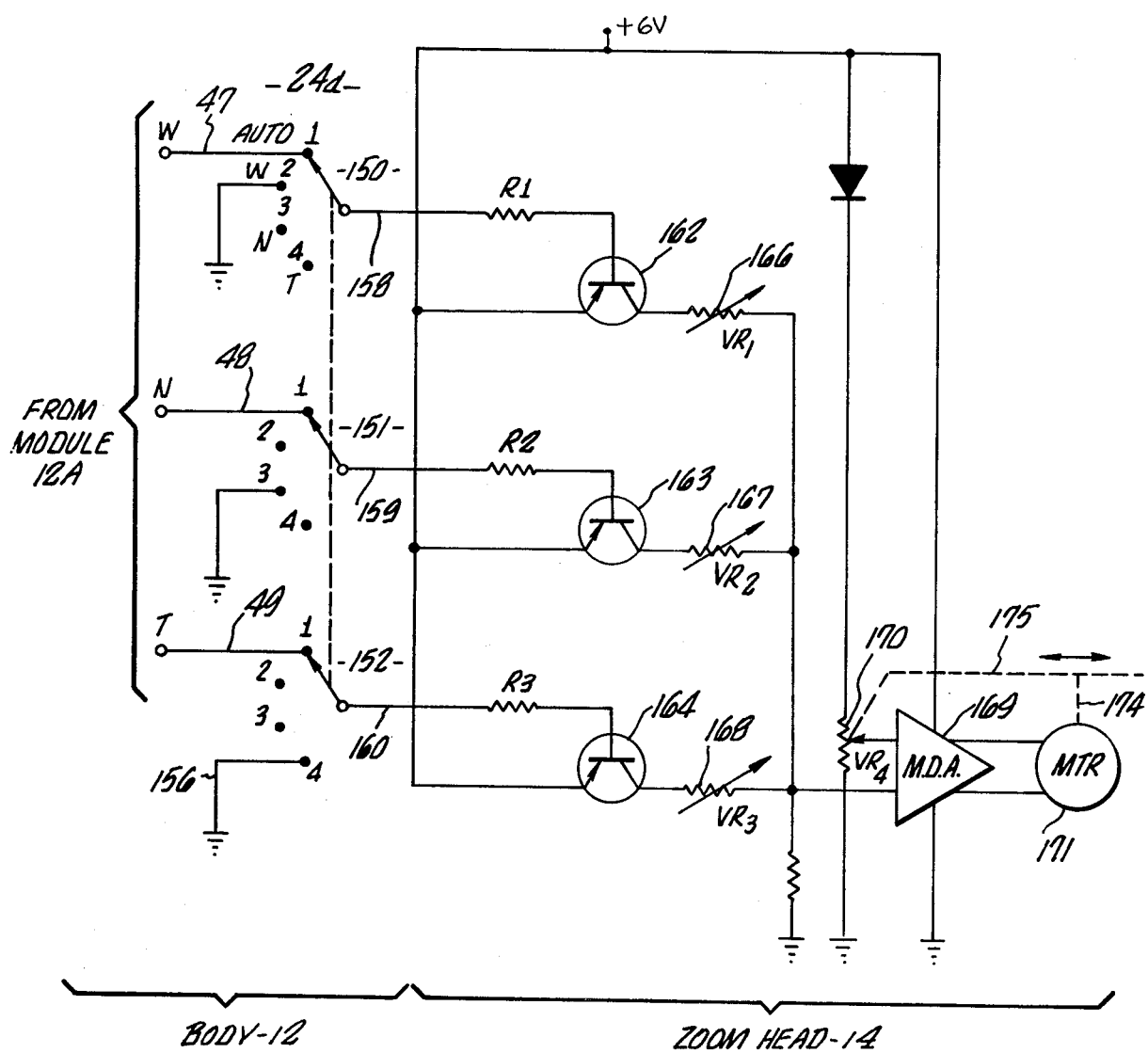

FIGS. 2 and 3 illustrate a preferred embodiment of a camera system including a modified zoom lens and modified electronic flash unit employing the concepts of the present invention. The camera 10 has a zoom lens 11 coupled thereto. The camera 10 has a conventional hot shoe (not shown) with which is coupled a module 12a of the electronic flash unit 12 in a usual manner. The module 12a preferably generally is of the "dedicated" type presently available as noted above for properly mechanically and electronically interfacing certain cameras with the flash head 12b of the flash unit 12 through contacts 18. However, the module 12a is modified in accordance with the present invention to include a directional light source 20 and light receiver or sensor 21. The module 12a further includes suitable contacts 22 for providing signals for zoom head control as will be discussed subsequently, and includes adjustable controls 24a-24c, and indicators 25a-25c, and an auto/manual selector switch 24d all of which will be explained in greater detail in connection with the discussion of the circuit of FIGS. 3a-3b. Suffice it to say at this point that the controls 24a-24c allow certain adjustments to be made by the photographer to suit the lens being used and the photographer's particular tastes and the respective indicators 25a-25c provide a visual indication of the zoom head position. The switch 24d allows manual selection of the positions of the zoom head 14 as well as automatic selection thereof.

The zoom lens 11 is substantially conventional, and as shown has a single control ring 28 or "pump" which slides in and out axially as indicated by arrows 29 for changing the focal length of the zoom lens, and is rotatable about the axis of the lens as indicated by arrows 30 for focusing the lens. The lens 11 is modified to include a bracing band 32 which has attached thereto or integrally formed therewith a reflecting ring 33. Light, preferably infra-red, from the source 20 is directed at the reflecting surface 33a of the ring 33, and is reflected therefrom to the receiving or sensing element 21. The ring 33 preferably is a non-specular reflecting ring so as to avoid a bright spot and other problems or errors that would be caused by a shiny surface. It can be a satin surface aluminum mirror to provide a wide angle of reflection with respect to the source 20 and sensor 21 so that variations in reflection angle (as the ring 33 is moved in and out axially) do not adversely affect the measurement signals. The band 32 and reflector ring 33 can be added to an existing zoom lens.

The light level at the receiver 21 varies as the inverse square of the distance D or, $R = (K\ E/D^2)$ where R is the light received, D is the distance as indicated at D in FIG. 2 between the source/sensor 20-21 and reflecting surface 33a, E is the light emitted by the source 20 and K is a constant. As will appear subsequently, the light from the source 20 can be suitably modulated so as to prevent or minimize interference from other surrounding light or radiation sources and to reduce power consumption. The light received by the receiving sensor 21 is applied to the circuit of FIG. 3 as will be discussed below, and that circuit provides a signal through contacts 22 for controlling a motor which positions the zoom head of the flash unit 12.

Accordingly, from the embodiment thus far described it will be apparent that as the focal length of the zoom lens is changed, signals indicative of the lens focal length are provided to the zoom head control circuit to cause the zoom head of the flash unit 12 to move to the corresponding position to provide a suitable angle of the cone of light emitted by the flash unit. The adjustment controls 24a-24c allow the photographer to adjust the switch-over point from wide angle to normal to telephoto to suit the lens in use and the aesthetic tastes of the photographer. Thus, by sensing the selected focal length of the lens, the flash unit zoom head can be adjusted automatically to the lens coverage (angle) set by the photographer as he readjusts the control ring 28 of the zoom lens.

FIG. 3a illustrates an exemplary lens focal length sensor circuit for the flash unit system of FIGS. 1-2 which can be housed in the module 12a. It includes a light source 22, such as a light emitting diode, powered from a low duty cycle oscillator 40, for example five hertz. This can be a low frequency since frequent samples are not necessary because the zoom motion is slow, and the duty cycle preferably is low so as to save power while still providing a strong signal for a short period of time. The output of the oscillator 40 is applied to an input of a sample and hold circuit 41. The light emitted by the source 22 is reflected from the surface 33a of ring 33 as described earlier, and the reflected light (preferably infrared) is received by the receiver or sensor 21 which may be a phototransistor. The emitter of the transistor 21 is connected to another input of the sample and hold circuit 41, which input has a calibration potentiometer also connected thereto for calibration.

The output of the sample and hold circuit 41 is connected to one input of three comparators 43, 44, and 45. The other inputs of these comparators are respectively connected to the variable tap of the adjustment potentiometers 24a, 24b, and 24c. As already noted, these potentiometers allow the photographer to adjust or select the switch-over point between wide angle, normal and telephoto to suit the photographer's lens and tastes. The output of the comparator 43 is connected to an output line 47 of a set of output lines 47-49. These lines go to the motorized zoom head through the contacts 22 of the module 12a for directing the motor to move the zoom head to the respective wide angle, normal and telephoto positions. The wide angle and tele signals on respective lines 47 and 49 direct the motor, and thus the head 14 (FIG. 1), to fixed limit positions, and the manual signal on line 48 directs the motor to an intermediate position. FIG. 3b shows the zoom head motor control system and will be discussed later.

The output of the comparator 44 is connected to one input of an And gate 52, the output of which is connected to the normal output line 48. The output of the comparator 43 is connected through a line 55 to an inverting input of the gate 52. In a similar manner, the output of the comparator 45 is connected to one input of an And gate 53, the output of which is connected to the tele output line 49. The output of the normal comparator 44 is connected by line 56 to an inverting input of the gate 53.

The gates 52 and 53 provide a logic circuit to ensure that only one zoom head position (wide angle, normal or telephoto) is selected by the comparator circuit at a time. With the logic as shown, the first or lowest level signal is a tele signal, the next normal, and the highest level is wide angle (the ring 33 is closest to the source 22 and sensor 21). Thus if wide angle is indicated, the signal on line 47 to gate 52 prevents the gate 52 from providing an output (normal) on line 48. In this case an output also exists from comparator 44 and the signal from the comparator 44 to the gate 53 prevents a tele signal from being provided on the line 49. With some lenses the pump 28 works in a reverse axial direction for changing focal length. In this case, the logic can be reversed (e.g., tele is now the strongest signal).

The output of the comparator 43 also is connected to the indicator 25a which may be a light emitting diode to indicate when the wide angle zoom head position is selected. In a similar manner, the outputs of the gates 52 and 53 are connected to respective similar indicators 25b and 25c.

As will be apparent to those skilled in the art from a review of the circuit in FIG. 3, the system periodically measures the received light as determined by the duty cycle of the output of the oscillator 40. The level of the light varies as a function of the distance of the reflecting surface 33a (FIG. 2) from the light source 22 and light sensor 21. The output of the sample and hold circuit 41 has a level proportional to the received light level and, thus, is indicative of the position of the reflective surface 33a. This output signal is compared in the comparators 43–45 with the preset levels of the adjustment controls 24a–24c, and one of the output lines 47, 48 or 49 provides an output for control of the motorized zoom head.

FIG. 3b is a circuit diagram illustrating in detail an auto/manual selector switch 24d (diagrammatically indicated in FIGS. 1 and 2) and the motor drive circuit for the zoom head 14. The switch 24d is a four position three bank switch with the first through fourth positions representing auto, wide-angle, normal and telephoto zoom and head positions. The lines 47–49 from the circuit of FIG. 3a are connected to the first taps of the switch 24d. The second, third and fourth taps of the first through third banks 150, 151, and 152 are grounded as indicated at 154 through 156. Output lines 158 through 160 from the banks 150 through 152 are connected to the bases of respective switching transistors 162–164. The collectors of these transistors are connected through variable resistances 166 through 168 to one input of a motor drive amplifier 169. A feedback potentometer 170 provides a variable feedback voltage to the other input of the motor drive amplifier 169. The output of the motor drive amplifier is connected to a drive motor 171 for the zoom head 14, and this motor is the motor of the motor drive system 15 diagrammatically illustrated in FIG. 1. The shaft of the motor 171, which is diagrammatically illustrated and 174, is connected to a linkage 175 which is connected between the zoom head and the movable arm of the feedback potentometer 170.

Figure 4:
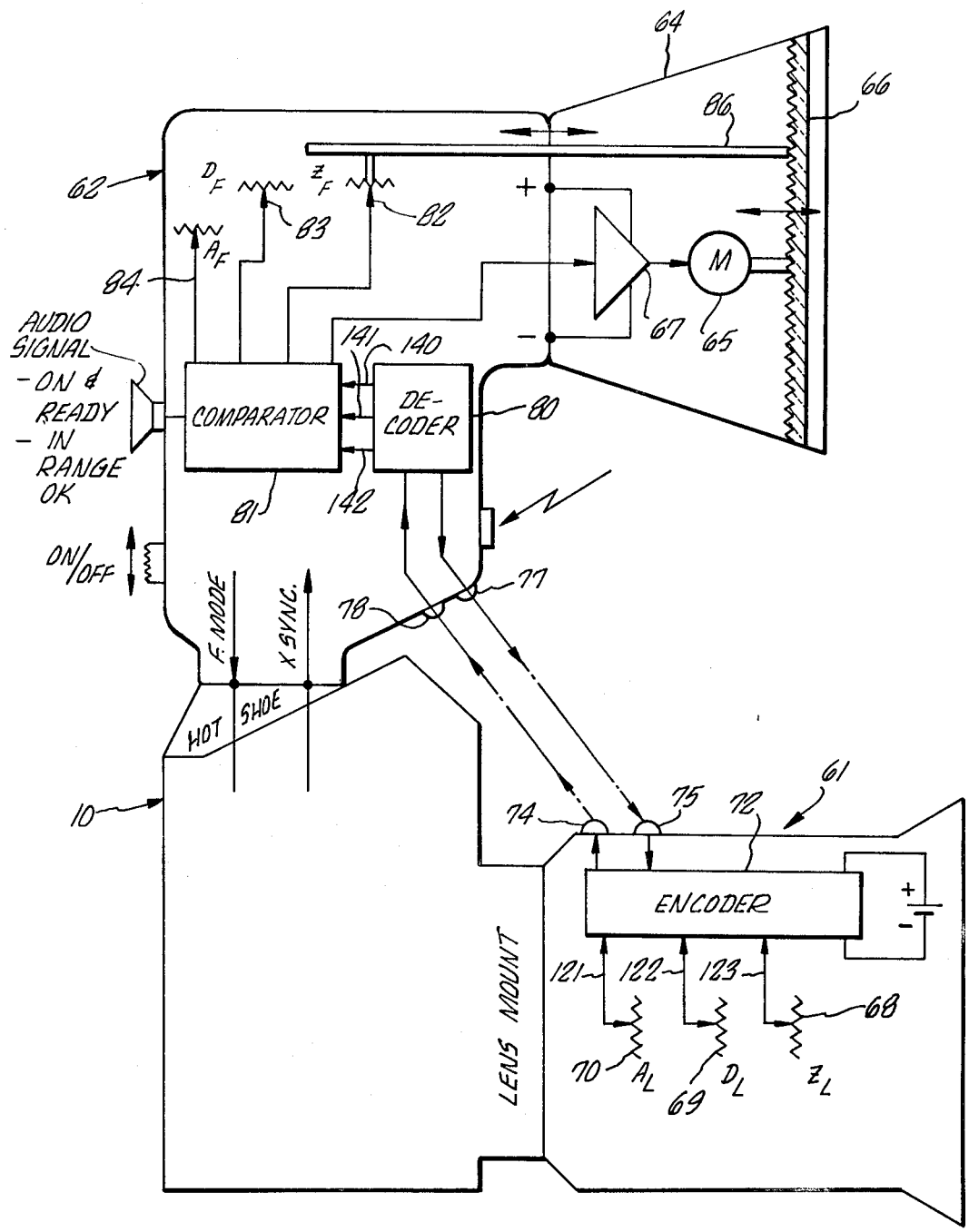
FIG. 4 is another view of a camera, lens and flash unit incorporating the concepts of the present invention.

FIG. 4 illustrates an alternative embodiment of a camera/lens/electronic flash system according to the present invention. In this embodiment, a conventional camera 10 of the 35 mm single lens reflex type has a lens 61 and an electronic flash unit 62 attached thereto. The flash unit 62 has a fixed head 64 but with a movable lens therein, such as a Fresnel 66, for providing the zoom feature for the flash light. The lens 66 can be moved in and out via a motor 65 and servo amp 67.

In this system, the lens 61 is a different form of lens which does not require the band 32 and reflector 33. It includes several potentiometers for indicating photographic parameters of the lens, such as a potentiometer 68 for indicating the set or selected lens focal length, a potentiometer 69 for indicating the distance to which the lens is focused, and a potentiometer 70 for indicating the selected aperture of the lens. These potentiometers are connected to an encoder 72 which provides output signals via a light emitting diode 74, when a sensor 75 is interrogated from the flash unit, to provide signals to the flash unit 12 indicative of these lens parameters. The encoder 72 may have a conventional automatic turn-off feature for causing the same to turn off for conserving power except when interrogated from the flash unit.

The flash unit 62 includes a light source 77, such as an LED, for providing an interrogation signal to the sensor 75 of the lens 61, and further includes a light sensor 78 for receiving the lens data from the source 74. The flash unit 62 also includes a decoder 80 for providing an interrogation initiate signal to the source 77, and for decoding the lens data received by the sensor 78. The decoder 80 is connected to a comparator circuit 81 which is similar to that of FIG. 3 for providing indications with respect to the lens focal length, and other lens parameters as desired. The comparator circuit 81 also has as an input a zoom feedback potentiometer 82 which provides a signal to the comparator indicative of the position of the lens 66 of the head 64. The feedback can be provided via an encoding rod linkage 86 for moving either the body of the potentiometer 82 or the wiper thereof in a well known manner.

The lens 66 thus is moved in and out automatically by the motor 65 controlled by the motor drive amplifier 67. The output of the comparator circuit 81 is connected to the motor drive amplifier 67 for controlling the positioning of the motor 65 and thus the position of the lens 66 of the flash unit.

The flash unit also can have potentiometers 83 and 84 for setting distance or sensitivity of the flash unit and film speed, respectively. These are connected as inputs to the comparator also. The focus of the lens as indicated by the lens potentiometer 69 in conjunction with the comparator 81 can enable automatic adjustment of the sensitivity of the flash unit (which basically is a function of film speed and focus distance). This arrangement also can enable the flash unit to provide an "in range" signal, for example, to indicate to the photographer that the subject being photographed with the flash is in range of out of range. The signal $D_L$ from potentiometer 69 indicates the distance to which the lens 61 is focused, and the signal $D_F$ from the potentiometer 83 can indicate, for example as noted above, the set distance for the flash unit and, thus, it is relatively simple to provide through an electrical comparison a signal for indicating "in range" or out of range for that matter. This can be operative in both the manual and automatic modes. If the subject is out of range, the photographer will know that the distance is too far and that he should move closer to the subject. Additionally, a similar comparison can be made with respect to the selected zoom position (signal $Z_F$ from the potentiometer 82) to likewise indicate an in or out of range condition. For example, the zoom head or lens of the flash unit could be set to the "tele" position and the lens at a "wide angle" position such that the angle of the flash of light would not cover the subject being photographed. Thus, if the "in range" signal does not exist or appear, the photographer knows to recheck his lens/flash set up.

The preferred mode of communicating the focal length selected is via an optical communications path such as is shown in FIG. 2 and FIG. 4; however, lenses and zoom lenses can be modified with, for example, a potentiometer system or the like such as shown in FIG. 4 but further including electrical contacts to enable an electrical output signal to be provided through the camera and its hot shoe, which electrical output signal is a function of the selected focal length of a zoom lens or the preset focal length of a fixed focal length lens.

Figure 5:
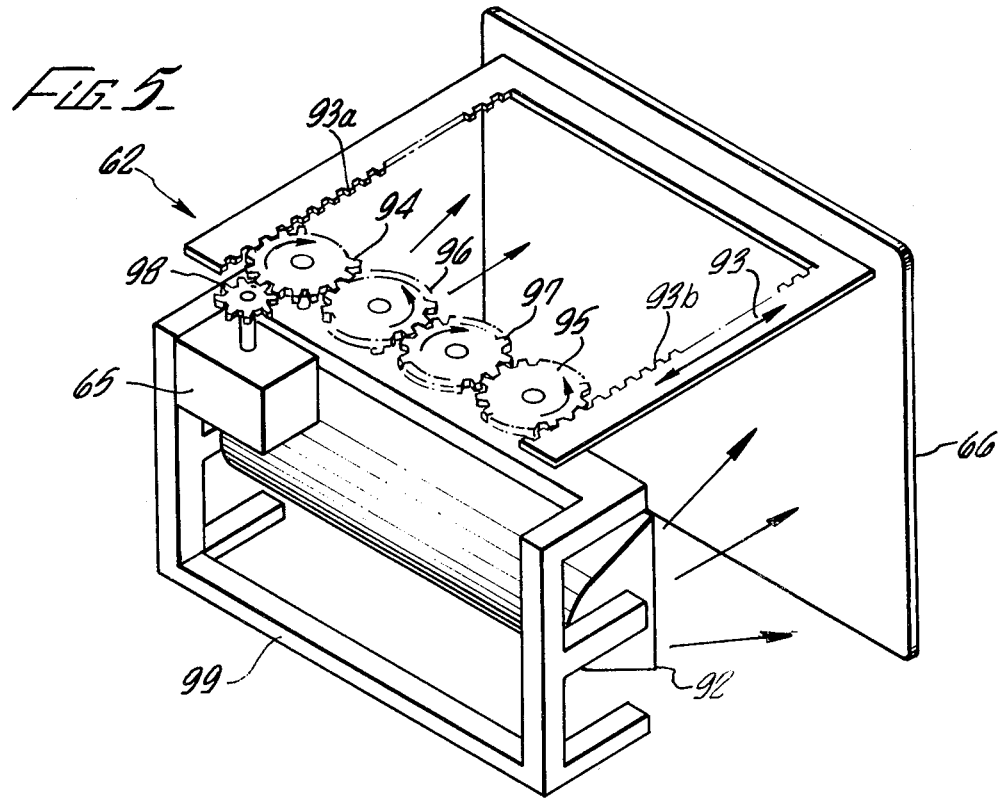
FIG. 5 is a perspective view of a motor drive for varying the position of a zoom head of a flash unit.

FIG. 5 diagrammatically illustrates a specific arrangement for moving a Fresnel lens 66 of a flash unit 62 with respect to the flashtube and reflector 92. A moving slide or rack 93 is affixed to the upper part of the Fresnel lens 66, and it has teeth 93a and 93b which engage the teeth of drive gears 94 and 95 which, in turn, are coupled with idle gears 96 and 97. The servo motor 65 has a gear 98 on its shaft engaging the gear 94. The servo motor 65 is secured to a fixed chassis 99 which likewise supports the gears and the flashtube and reflector. As will be apparent to those skilled in the art, as the shaft of the motor 65 rotates the gears cause the slide 93 to move in and out, thereby changing the position of the Fresnel lens with respect to the flash tube and the angle of the come of light emitted by the flash unit. An alternative arrangement (not shown) can be provided wherein the slide 93 is secured to the reflector and flashtube for moving the same with respect to a Fresnel lens disposed in a fixed position.

FIGS. 6 and 7 illustrate the encoder 72 and decoder 80 of FIG. 4, along with waveforms which further illustrate the operation of the system. Turning first to FIG. 6a, the encoder 72 of FIG. 4 includes a one-shot circuit 110 connected to receive the signal from the sensor 75. The circuit 110 is connected to the gate of a field effect transistor 111 which serves to gate electrical power to a counter 112 and to a clock 113. Waveform A in FIG. 6b shows a pulse 114 supplied by the light sensor 75 to the one-shot circuit 110, and waveform B shows a signal 115 which represents the power applied to the counter 112 and clock 113. Waveform C shows clock pulses 116 applied from the clock 113 to the count input of the counter 112. Since there are only three parameters to be sampled and encoded, the counter 112 provides three outputs to FET's 118, 119 and 120 which are connected to respective lines 121, 122 and 123 from the potentiometers 70, 69 and 68 of the lens of FIG. 4. Waveform D shows the outputs 126–128 of the counter 112 and thus the "on" states of FET gates 118–120 of FIG. 6b, and these pulses are applied to a voltage to frequency converter 130. An example of a suitable voltage to frequency converter is a precision voltage-to-frequency converter mode LM331 sold by National Semiconductor. This circuit provides an output on a line 131 to the light emitting diode 74. The frequency of the signals, as indicated at $F_A$, $F_D$ and $F_L$ in waveform E of FIG. 6b are different and are a function of the voltages on the respective lines 121, 122 and 123 which, in turn, are a function of the settings of the potentiometers 70, 69 and 68.

Thus, the settings of the potentiometers 68–70 are sampled upon receipt of a signal by the sensor 75, and these signals are encoded and transmitted by the light emitting diode 74.

Figure 7A:
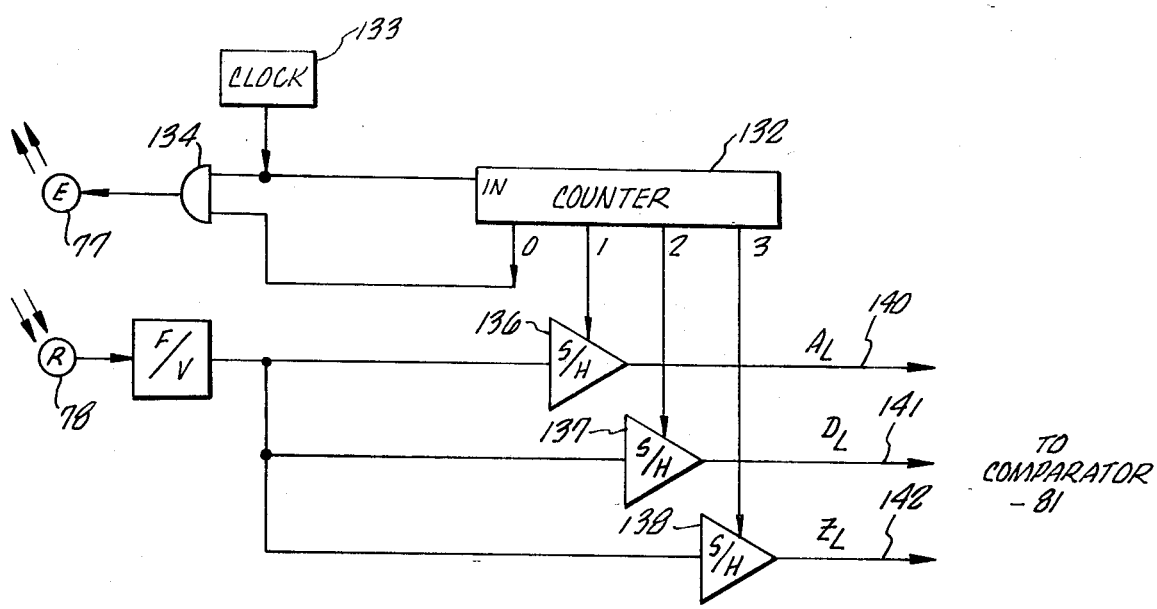
FIG. 7a is a block diagram of the decoder of FIG. 4.
Figure 7B:
FIG. 7b is a waveform illustrating the operation of the decoder.
Figure 7B:
Figure 7B:
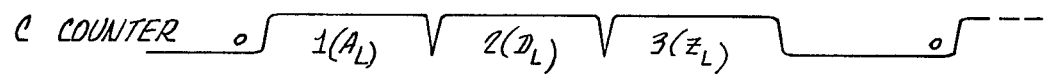
Figure 7B:
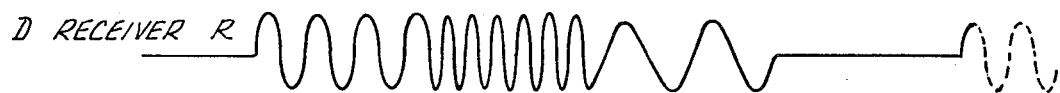

The decoder 80 of FIG. 4 works in a manner somewhat similar to the encoder just described. The decoder as more particularly shown in FIG. 7a includes a clock 133 connected to a counter 132. The clock 133 also is connected to an And gate 134, the output of which is connected to the light emitting diode 77. The "0" output of the counter 132 is connected as a second input to the And gate 134. The clock 133 supplies clock pulses to the counter 132 and to the gate 134, thereby causing the counter 132 to count through a sequence of four counts. Waveform A of FIG. 7b illustrates the clock pulses. At the zero count of the counter 132, the gate 134 is enabled at the next clock pulse to provide an output to the LED 77 as indicated in waveform B of FIG. 7b. As the count in the counter 132 increases, sample and hold circuits 136, 137 and 138 are enabled. The light sensor 78 is connected to a frequency to voltage converter, which likewise may be a LM331 by National Semiconductor, and the output of this converter is connected as an input to each of the sample and hold circuits 136–138. As these latter circuits are enabled as indicated by the waveform C of FIG. 7b, they pass the respective different frequency pulses or waveforms as indicated in waveform D of FIG. 7b to respective output lines 140, 141 and 142 to the comparator 81 of FIG. 4. It will be apparent then that when the clock 133 is enabled or otherwise turned on, such as by turning on the flash unit or putting it into the automatic mode, interrogation pulses are generated and corresponding light pulses are emitted by the source 77. These pulses interrogate the encoder of FIG. 6a which, in turn, sends out signals via the source 74 indicative of the settings of the potentiometers 68–70. These signals are received by the sensor 78 of the decoder of FIG. 7a and are appropriately sent to the comparator 81.

While embodiments of the invention have been described, it is to be understood that the invention is not limited to the details herein explained and that those skilled in the art will recognize numerous variations which come within the spirit and scope of the invention and which are intended to be included herein.

What is claimed is:
1. An automatic zoom flash system for use with a camera and lens comprising
   a flash unit having a flashtube for emitting a flash of light for taking a photograph
   focusing means disposed in a relationship with said flashtube for selectively changing the angle of the cone of light emitted by the flashtube,
   means responsive to a flash initiation signal for causing said flashtube to emit a flash of light, and
   control means responsive to the focal length of a lens disposed on the associated camera for causing said focusing means to change the angle of said cone of light as a function of the focal length of the lens.
2. A flash system as in claim 1 wherein
   said focusing means comprises lens means and means for moving the flashtube and lens means relative to one another.
3. A flash system as in claim 1 wherein
   said system is adapted to be used with a camera having a zoom lens thereon, and wherein the zoom lens has reflector means coupled with a zoom ring thereof, and
   said control means comprises means for directing radiation at and receiving radiation from said reflector means for detecting the focal length selected by the zooming ring of said lens.

4. A flash system as in claim 3 wherein
said reflector means comprises a ring affixed to the focal length selector of the lens and comprises a non-specular reflector coupled with said ring.

5. A flash system as in claim 1 wherein
said control means responsive to focal length of a lens comprises electrical transducer means for providing an electrical signal which is a function of the focal length of the lens, and comprises circuit means responsive to said electrical signal for causing said focusing means to change the angle of said cone of light as a function of the focal length of the lens.

6. A flash system as in claim 5 wherein
said transducer means is connected to encoder means for generating encoded signals which are a function of the focal length of the lens, and said circuit means includes decoder means for receiving said encoded signals and for providing signals for control of said focusing means.

7. An automatic zoom flash system for use with a camera and lens comprising
 a flash unit having a flashtube for emitting a flash of light for taking a photograph,
 electromechanically adjustable zoom flash head means disposed with respect to said flash tube for changing the angle of the cone of light emitted by the flash tube, said flash head means being adjustable for changing the angle of the cone of light in response to a lens parameter, and
 circuit means for detecting said lens parameter and providing a signal for causing adjustment of said flash head means.

8. An automatic zoom flash system for use with a camera and a zoom lens having selectable focal lengths comprising
 a flash unit having a flashtube for emitting a flash of light for taking a photograph
 focusing means disposed in a relationship with said flashtube for selectively changing the angle of the cone of light emitted by the flashtube, said focusing means comprising lens means,
 control means for moving the flashtube and lens means relative to one another for changing the angle of the cone of light, and
 detector means for detecting the selected focal length of the zoom lens and relaying a signal as a function of said selected focal length to said control means.

9. A system as in claim 8 wherein
said detector means comprises means for directing electromagnetic radiation toward an element of the zoom lens for thereby detecting its selected focal length, and for receiving radiation therefrom.

10. A system as in claim 8 wherein
said detector means comprises means for sending interrogation signals to a component of the zoom lens which component provides focal length signals indicative of the focal length selected for the zoom lens, and said detector means includes means for receiving the focal length signals from the zoom lens.

11. An electronic flash system comprising
 a flash head and flashtube for emitting a selectable cone of light for taking a flash photograph, and wherein the flashtube and head are relatively movable to select the cone of light,
 means for providing a first signal representing the selected cone of light,
 means for providing a second signal indicating the focal length selected for a camera lens with which the flash head is to be associated in taking a flash photograph, and
 circuit means responsive to said first and second signals for providing a signal indicating whether the focal length of the lens and the selected cone are such that the subject to be photographed is within a predetermined range.

* * * * *